United States Patent [19]
Lang et al.

[11] Patent Number: 5,604,644
[45] Date of Patent: Feb. 18, 1997

[54] REAR-VIEW MIRROR, IN PARTICULAR FOR TRUCKS

[75] Inventors: Heinrich Lang, Ergersheim; Wolfgang Seiboth, Bad Windsheim, both of Germany

[73] Assignee: Mekra Rangau Plastics GmbH & Co. KG, Germany

[21] Appl. No.: 354,680

[22] Filed: Dec. 13, 1994

[30] Foreign Application Priority Data

Dec. 21, 1993 [DE] Germany ............................ 43 43 691.9

[51] Int. Cl.$^6$ .................................................. G02B 7/182
[52] U.S. Cl. ......................... 359/871; 359/872; 359/874; 359/875; 359/881
[58] Field of Search ................................. 359/871, 872, 359/874, 875, 881; 248/466, 473, 488, 490, 497

[56] References Cited

U.S. PATENT DOCUMENTS

| | | | |
|---|---|---|---|
| 3,656,830 | 4/1972 | Kurschner | 359/514 |
| 4,258,894 | 3/1981 | Niggemann | 248/483 |
| 4,572,626 | 2/1986 | Suzuki | 359/876 |
| 4,693,571 | 9/1987 | Kimura et al. | 359/874 |
| 5,110,196 | 5/1992 | Lang et al. | 359/875 |
| 5,115,353 | 5/1992 | Mori et al. | 359/871 |

FOREIGN PATENT DOCUMENTS

| | | |
|---|---|---|
| 2729725 | 1/1979 | Germany . |
| 3049169A1 | 7/1982 | Germany . |
| 3614927A1 | 11/1987 | Germany . |
| 4240773A1 | 6/1993 | Germany . |
| 1095331 | 12/1967 | United Kingdom .................. 359/871 |
| 1517601 | 7/1978 | United Kingdom . |
| WO92/03309 | 3/1992 | WIPO . |

OTHER PUBLICATIONS

Patent Abstracts of Japan M–914 Dec. 27, 1989 vol. 13/No. 593 "Rear View Mirror Device".

Primary Examiner—Paul M. Dzierzynski
Assistant Examiner—Mohammad Y. Sikder
Attorney, Agent, or Firm—Laff, Whitesel, Conte & Saret, Ltd.

[57] ABSTRACT

A rear-view mirror comprises a holder and a housing adjustably supported on the latter. A mirror glass is tightly, but detachably disposed on the housing. The mirror glass is fixed on a support plate, its entire surface lying free. The support plate is detachably disposed on the housing, in particular by elastic locking.

19 Claims, 2 Drawing Sheets

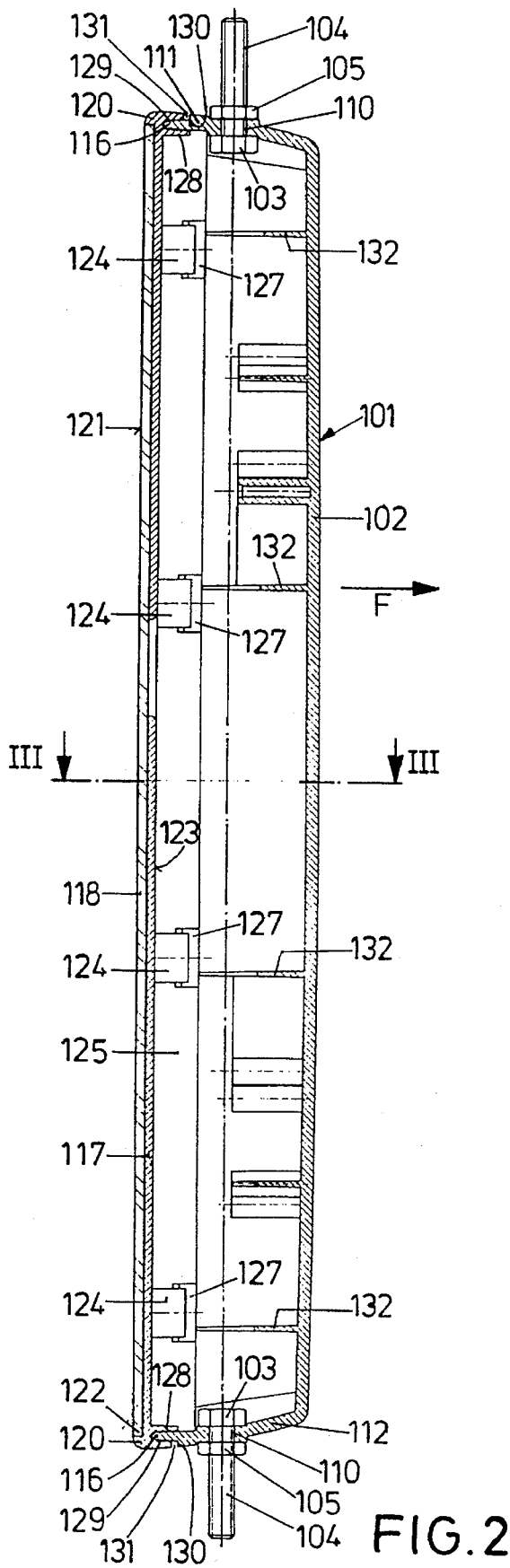
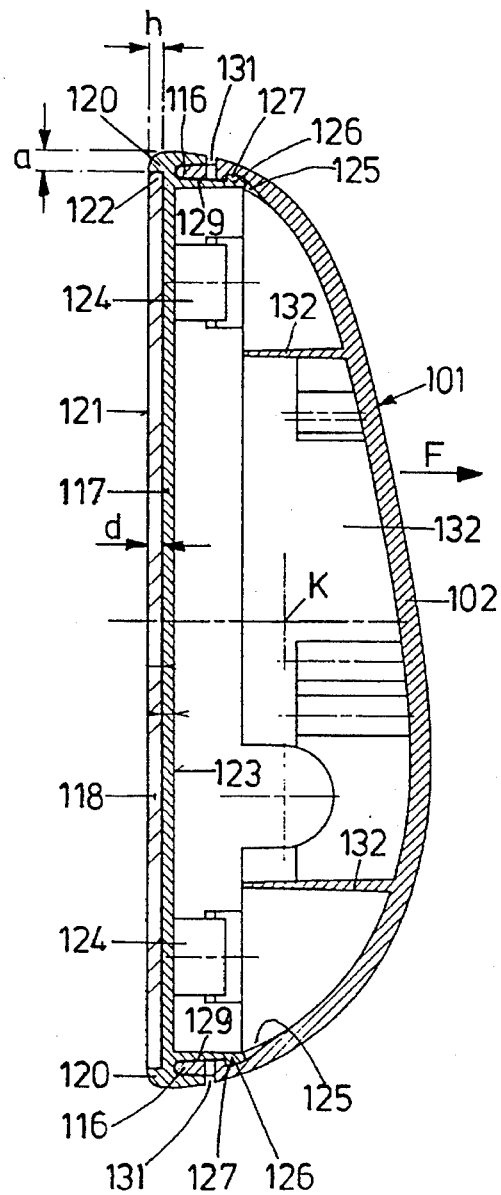
FIG. 2
FIG. 3

REAR-VIEW MIRROR, IN PARTICULAR FOR TRUCKS

BACKGROUND OF THE INVENTION

1. Field of the Invention

The invention relates to a rear-view mirror, in particular for trucks, comprising a holder, an adjustable, possibly motor-adjustable housing on the holder and a mirror glass disposed on the housing in a manner fixed relative to the latter but interchangeable.

2. Background Art

Rear-view mirrors of the generic type are for instance known from U.S. Pat. No. 5,110,196. In these rear-view mirrors, the mirror glasses are retained interchangeably by means of a flame-like holder of hard elastic plastics, the mirror glass bearing against a supporting edge of the housing. The retaining ring is slipped over the mirror glass and locked into place on the outside of the housing by backing the supporting edge of the housing. It projects toward the surface of the mirror glass, covering an edge portion of the surface and thus of the useful face of view of the mirror, and projects outwards from the mirror glass and the housing. Moreover, the ring is reflected on the mirror glass, the reflecting coating of the mirror glass not being on the latter's external surface, but on the side facing the housing. As a result of the measures specified, the driver's field of view is restricted, and that for a portion between the useful face of the mirror and the free field of view, this portion acting as a comparatively wide rim due to the specified design and effect.

SUMMARY OF THE INVENTION

It is the object of the invention to embody a rear-view mirror of the generic type such that the driver's field of view is restricted as little as possible.

In accordance with the invention this object is attained by the mirror glass being fixed on a support plate, by the entire surface of the mirror glass lying free and by the support plate being detachably disposed on the housing. The measures according to the invention assure that there is no rim impeding the field of view, i.e. the view past the mirror, on the edge portion of the mirror face to be used by the driver. There is virtually no separation, i.e. virtually no dead space, between the mirror image observed by the driver and the field of view ahead past the mirror. The measure according to which the support plate is provided with a rim encircling the edge of the mirror glass and not projecting over the surface of the mirror glass, serves the purpose of reliably fastening and protecting the mirror glass on the support plate without this rim leading to any substantial visual interference. It primarily serves to cover and protect the edge of the mirror glass.

The further development according to which the support plate supporting the mirror glass is locked into place in the housing, ensures that the basic requirement, namely to make the mirror glass interchangeable, is achievable also by the solution according to the invention. In the further development according to which an encircling, groove-like and externally open recess is formed between the support plate and the adjacent wall portion of the housing, the configuration according to the invention results in the soiling of the glass being even further reduced.

Preferred embodiments of the invention are shown in the accompanying drawings.

BRIEF DESCRIPTION OF THE DRAWINGS

FIG. 2 is a vertical section of an external rear-view mirror of a second embodiment, and FIG. 3 is a horizontal section of this mirror according to section line III—III of FIG. 2.

DESCRIPTION OF THE PREFERRED EMBODIMENTS

Figure 1:
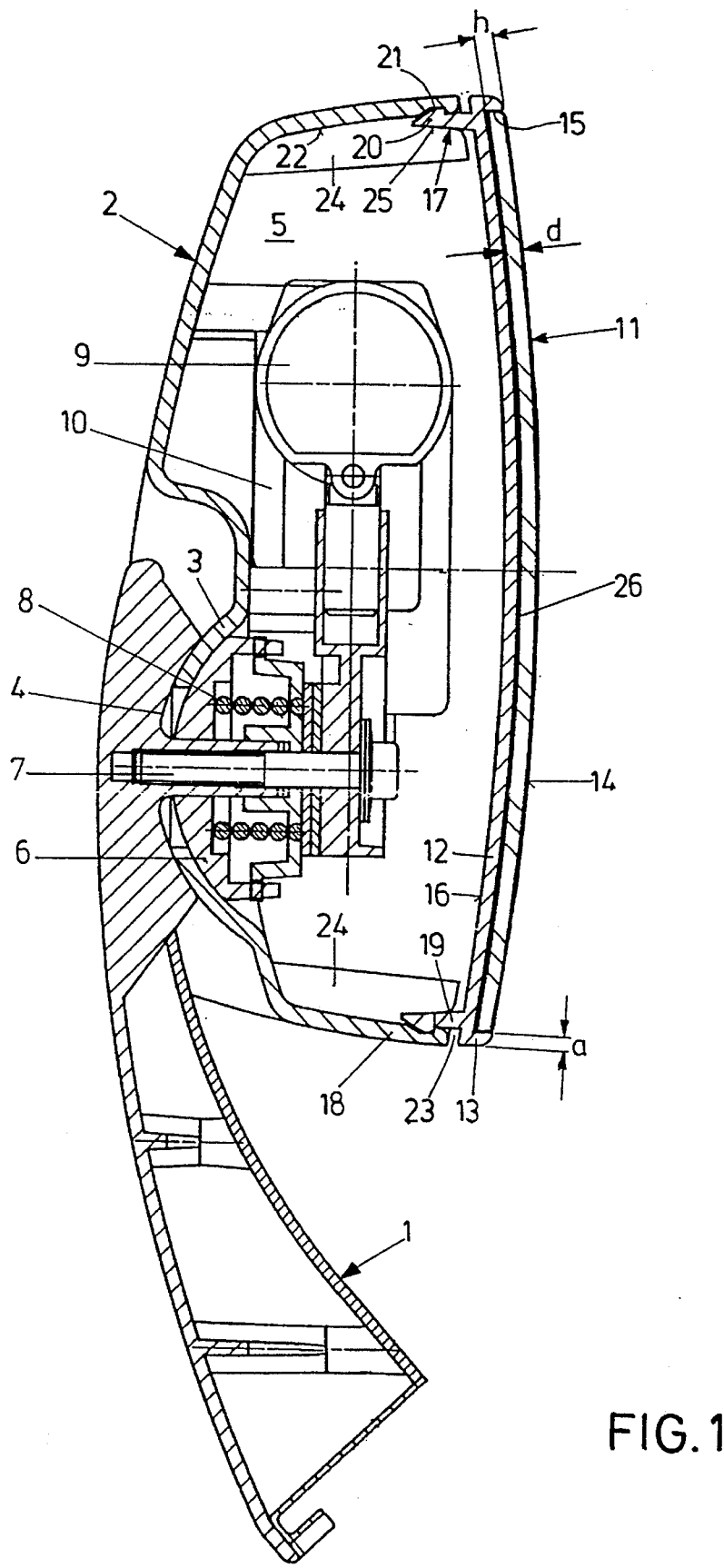
FIG. 1 is a horizontal section of an external rear-view mirror according to a first embodiment.

The rear-view mirror illustrated in FIG. 1 is an external rear-view mirror in particular for trucks. It has a holder 1, which is attachable to the driver's cab of a truck and on which a housing 2 is pivotably supported. A universal-ball-joint-type bearing shell 3 of the housing 2 is positioned in a corresponding bearing recess 4 of the holder 1 and is forced into the bearing recess 4 by means of a bearing body 6 located in the inner chamber 5 of the housing 2. The whole package is held together by means of a threaded bolt 7, against which a compression spring 8 bears indirectly, the latter supporting itself on the bearing body 6 so that the bearing body 6 is forced by sufficient pressure against the bearing shell 3 and the latter in turn against the bearing recess 4. For the pivotal adjustment of the housing 2 relative to the holder 1, two servomotors 9, 10 are provided which, on the one hand, are fixed in the housing 2 and, on the other hand, connected with the threaded bolt 7 which is tightly screwed into the holder 1. This embodiment is basically known and of no importance for the invention.

The housing 2 is provided with a mirror glass 11, of which the rear side 26 is glued on the support plate 12. This support plate 12 has an encircling rim 13 of a height h at maximum corresponding to the thickness d of the mirror glass 11. Externally, the rim 13 is tapered or necked toward the mirror glass 11 so that the rim 13 has a negligible thickness in the plane of the surface 14 of the mirror glass 11. The basic thickness a of the rim 13 only amounts to 2 to 3 mm anyway, since it only serves to protect the edge 15 of the mirror glass 11. The mirror coating, not specifically shown, of the mirror glass 11 is as usually located on the side of the mirror glass 11 facing the support plate 12.

On its rear 16 turned away from the mirror glass 11, the support plate 12 is provided with an encircling locking web 17. The latter substantially consists of a wall section 19 which projects into the associated open wall portion 18 of the housing 2 and closely rests on the inside of the wall portion 18. Toward its free end, the wall section 19 is provided with an equally encircling barb-like projection 20. The projection 20 tapers inwardly toward the free end of the wall section 19, its cross-sectional area having the shape of a longitudinally slit arrowhead. An encircling groove-like recess 21 of the inside wall 22 of the housing 2 is assigned to the projection 20, the latter locking into place in the recess 21 once the locking web 17 has been pushed into the wall portion 18 of the housing 2. An externally open groove-like recess 23 remains between the rear 16 of the support plate 12 and the wall portion 18 of the housing 2, causing a stall of the flow of the air during the travel of a vehicle so that the soiling of the surface 14 of the mirror glass 11 is reduced.

As seen in the drawing, the rim 13 of the support plate 12 does not project outwards from the wall portion 18 anywhere, there being no additional visual interference through the housing 2.

Ribs 24 extending as far as the edge of the housing 2 are arranged on the inside wall 22 of the housing; they have a cutout 25 suited to the locking web 17 so that—as seen in the drawing—the locking webs 17 are supported toward the inner chamber 5 of the housing 2, i.e. they are retained in the recess 21 by the projection 20.

FIGS. 2 and 3 illustrate an embodiment of a truck rear-view mirror usually denoted as West Coast mirror and preferably employed for trucks of U.S. American design.

The mirror has a flat housing shell 101 of approximately rectangular shape. The latter is provided with a bottom 102 arching counter to the direction of travel F about a vertical axis of curvature K with variable radiuses of curvature.

A recess 110 is provided in both the upper and lower side wall 111, 112 of the housing shell 101 for the latter to be fixed to a truck; a fastening screw 103, of which a threaded bolt 104 projects outward, is inserted in each of the recesses 110. Nuts 105 serve to join the fastening screws 103 firmly to the housing shell 101. By way of the two threaded bolts 104 the fastening screws 103 are further inserted in retaining arms —not shown—producing the assembly of the mirror on the truck body. The mirror is pivotable about a vertical axis defined by both the fastening screws 103.

The edge 116 of the housing shell 101 is directed counter to the direction of travel F, defining a substantially rectangular opening that is closed by a mirror support plate 117, on which the rear 119 of a mirror glass 118 is glued. Again the support plate 117 has an encircling rim 120 of a height h at maximum corresponding to the thickness d of the mirror glass 118. Externally, the rim 120 is tapered or necked toward the mirror glass 11 so that the rim 13 has a negligible thickness in the plane of the surface 121 of the mirror glass 118. As in the first examplary embodiment, the basic thickness a of the rim 120 only amounts to 2 to 3 mm, since it only serves to protect the edge 122 of the mirror glass 118. In this case, too, the mirror coating, not specifically shown, of the mirror glass 118 is as usually located on the side of the mirror glass 118 facing the support plate 117.

On its rear 123 turned away from the mirror glass 118, the support plate 117 is provided with locking webs 124 lined up along the two vertical edges of the support plate 117. The locking webs 124 are displaced inwardly as referred to the rim 120 and, resting closely on the inside of the associated open wall portion 125, they project into the opening of the housing shell 101 defined by the edge 116. At their free ends the locking webs 124 are provided with barb-like projections 126 elastically locking into place in associated locking recesses 127 on the inside of the open wall portion 125 of the housing shell 101.

In the vicinity of the upper and lower side wall 111, 112 of approximately horizontal extension, the support plate 117 is provided with bearing webs 128 displaced inwardly as referred to the rim 120 and resting on the inside of the open wall portion 125 in the vicinity of these side walls 111, 112 in the position of assembly shown in FIG. 2.

As seen in FIGS. 2 and 3, the rim 120 of the support plate 117 is prolonged to extend beyond the rear 123 of the support plate 117, and in cooperation with the bearing webs 128 and the locking webs 124, respectively, forms an accommodation gap 129 in which the edge 116 of the housing shell 101 takes its place in the position of assembly shown. An externally open groove-like recess 131 remains between the edge oriented in the direction of travel F, of the rim 120 and a step-like shoulder 130 on the outside of the housing shell 101 and causes a stall of the flow of the air during the travel of a vehicle so that the soiling of the surface 121 of the mirror glass 118 is reduced.

FIG. 2 further illustrates that supporting webs 132 providing for additional stabilisation of the housing shell 101 are formed inside the latter.

What is claimed is:

1. A rear-view mirror, in particular for trucks, comprising a holder (1, 103), a housing (2, 101) being adjustably arranged on the holder (1,103) via a joint means (3, 4, 105, 110);

a mirror glass (11, 118) disposed on said housing (2, 101), said mirror glass being fixed relative to said housing and interchangeable, the mirror glass (11, 118) has a rear side (26, 119), a surface (14, 121), and an edge (15, 122);

a support plate (12, 117), upon which said mirror glass is fixed, wherein the entire surface (14, 121) of the mirror glass (11, 118) lies free and wherein on a rear (16, 123) of the support plate (12, 117) turned away from the mirror glass (11, 118), the support plate (12, 117) is provided with at least one locking web (17, 124) which engages with a suited recess (21, 127) in the housing (2, 101), said support plate being detachably disposed on the housing.

2. A rear-view mirror according to claim 1, wherein the at least one locking web (17, 124) is provided with at least one projection (20, 126) engaging with the recess (21, 127).

3. A rear-view mirror according to claim 1, wherein the support plate (12, 117) is provided with a rim (13, 120) encircling the edge (15, 122) of the mirror glass (11, 118) and not projecting over the surface (14, 121) of the mirror glass (11, 118).

4. A rear-view mirror according to claim 3, wherein the rim (13, 120) tapers toward the mirror glass (11, 118) in a direction toward the surface (14, 121) of the mirror glass (11, 118).

5. A rear-view mirror according to claim 1, wherein a wall portion (18, 125) adjacent to the support plate (12, 117) of the housing (2, 101) does not project from the circumference of the support plate (12, 117).

6. A rear-view mirror according to claim 1, wherein the support plate (12, 117) supporting the mirror glass (11, 118) is locked into place in the housing (2, 101) and is detachably disposed on the housing by a locking means.

7. A rear-view mirror in particular for trucks, comprising a holder (1, 103), a housing (2, 101) being adjustably arranged on the holder via a joint means (3, 4, 105, 110) and a mirror glass (11, 118) disposed on the housing in a manner fixed relative to the housing and interchangeable, the mirror glass has a rear side (26, 119), a surface (14, 121), and an edge (15, 122);

a support plate (12, 117), upon which said mirror glass is fixed, wherein the entire surface (14, 121) of the mirror glass lies free, wherein the support plate is detachably disposed on the housing, wherein a wall portion (18, 125) adjacent to the support plate (12, 117), of the housing (2, 101) does not project from the circumference of the support plate (12, 117), and wherein an encircling, groove-like and externally open recess (23, 131) is formed between the support plate (12, 117) and the adjacent wall portion (18, 125) of the housing (2, 101).

8. A rear-view mirror according to claim 7, wherein the support plate (12, 117) is provided with a rim (13, 120) encircling the edge (15, 122) of the mirror glass (11, 118) and not projecting over the surface (14, 121) of the mirror glass (11,118).

9. A rear-view mirror according to claim 8, wherein the rim (13, 120) tapers toward the mirror glass (11, 118) in a direction toward the surface (14, 121) of the mirror glass (11, 118).

10. A rear-view mirror according to claim 7, wherein the support plate (12, 117) is detachably disposed on the housing by a locking means.

11. A rear-view mirror according to claim 7, wherein on a rear (16, 123) of the support plate (12, 117) turned away from the mirror glass (11, 118), the support plate (12, 117) is provided with at least one locking web (17, 124) which engages with a suited recess (21, 127) in the housing (2, 101).

12. A rear view mirror according to claim 11, wherein the at least one locking web (17, 124) is provided with at least one projection (20, 126) engaging with the recess (21, 127).

13. A rear-view mirror according to claim 8, wherein the rim (120) is elongated beyond a rear side (123) of the Support plate (117), forming an accommodation gap (129) for an edge portion (116) of the housing (102).

14. A rear-view mirror in particular for trucks, comprising a holder (1, 103), a housing (2, 101) being adjustably arranged on the holder via a joint means (3, 4, 105, 110) and a mirror glass (11, 118) disposed on the housing in a manner fixed relative to the housing and interchangeable, the mirror glass has a rear side (26, 119), a surface (14, 121), and an edge (15, 122);

a support plate (12, 117), upon which said mirror glass is fixed, wherein the entire surface (14, 121) of the mirror glass (11, 118) lies free, wherein the support plate (12, 117) is detachably disposed on the housing (2, 101), and wherein the support plate (12, 117) is provided with a rim (13, 120) encircling the edge (15, 122) of the mirror glass (11, 118) and not projecting over the surface (14, 121) of the mirror glass (11, 118), and wherein the rim (12) is elongated beyond a rear side (123) of the support plate (117), forming an accommodation gap (129) for an edge portion (116) of the housing (102).

15. A rear-view mirror according to claim 14, wherein the rim (13, 120) tapers toward the mirror glass (11, 118) in a direction toward the surface (14, 121) of the mirror glass (11, 118).

16. A rear-view mirror according to claim 14, wherein a wall portion (18, 125) adjacent to the support plate (12, 117), of the housing (2, 101) does not project from the circumference of the support plate (12, 117).

17. A rear-view mirror according to claim 14, wherein the support plate (12, 117) is detachably disposed on the housing by a locking means.

18. A rear-view mirror according to claim 14, wherein on a rear (16, 123) of the support plate (12, 117) turned away from the mirror glass (11, 118), the support plate (12, 117) is provided with at least one locking web (17, 124) which engages with a suited recess (21, 127) in the housing (2, 101).

19. A rear-view mirror according to claim 18, wherein the at least one locking web (17, 124) is provided with at least one projection (20, 126) engaging with the recess (21, 127).

* * * * *